(12) United States Patent
Schmitz et al.

(10) Patent No.: US 7,587,390 B2
(45) Date of Patent: Sep. 8, 2009

(54) SYSTEM AND METHOD FOR RECEIVING AND LOADING FARE AND SCHEDULE DATA

(75) Inventors: Benjamin W. Schmitz, Chicago, IL (US); Patrick D. Chauncey, Chicago, IL (US); Mark W. Jaeger, Evanston, IL (US)

(73) Assignee: Orbitz LLC, Chicago, IL (US)

( * ) Notice: Subject to any disclaimer, the term of this patent is extended or adjusted under 35 U.S.C. 154(b) by 193 days.

(21) Appl. No.: 11/420,208

(22) Filed: May 24, 2006

(65) Prior Publication Data
US 2006/0206465 A1     Sep. 14, 2006

Related U.S. Application Data

(63) Continuation of application No. 09/872,948, filed on Jun. 1, 2001, now Pat. No. 7,231,382.

(51) Int. Cl.
*G06F 7/00* (2006.01)
(52) U.S. Cl. .......................................... 707/3; 709/207
(58) Field of Classification Search ................. 707/3–5; 709/217
See application file for complete search history.

(56) References Cited

U.S. PATENT DOCUMENTS

| | | | | |
|---|---|---|---|---|
| 6,834,229 | B2 * | 12/2004 | Rafiah et al. ................ | 701/201 |
| 7,231,382 | B2 | 6/2007 | Schmitz et al. | |
| 2001/0053989 | A1 * | 12/2001 | Keller et al. .................... | 705/5 |
| 2002/0032677 | A1 * | 3/2002 | Morgenthaler et al. ......... | 707/3 |
| 2002/0038348 | A1 * | 3/2002 | Malone et al. ............... | 709/217 |
| 2002/0133382 | A1 * | 9/2002 | DeMarcken et al. ........... | 705/5 |
| 2002/0143587 | A1 * | 10/2002 | Champernowne .............. | 705/5 |

OTHER PUBLICATIONS

Notice of Allowance and Fee(s) Due for U.S. Appl. No. 09/872,948, (Parent), dated Apr. 12, 2007.
Advisory Action for U.S. Appl. No. 09/872,948, (Parent), dated Jun. 13, 2006.
Interview Summary for U.S. Appl. No. 09/872,948, (Parent), dated May 10, 2006.
Final Office Action for U.S. Appl. No. 09/872,948, (Parent), dated Apr. 3, 2006.
Non-final Office Action for U.S. Appl. No. 09/872,948, Oct. 7, 2005.

* cited by examiner

*Primary Examiner*—Sathyanarayan Pannala
(74) *Attorney, Agent, or Firm*—Wildman, Harrold, Allen & Dixon LLP

(57) ABSTRACT

A system for searching a data set to identify data elements with the data set that meet user defined criteria. The system comprises a network file system server, a data search engine server communicating with the network file system server, and a query distributor configured to send search queries to the data search engine server. An old data set and a new data set are stored on the network file system server in a manner such that said data search engine server may selectively access and transfer portions of the old data set and the new data set to a data storage memory of the data search engine server, where the data search engine server identifies data elements within the accessed portions of the old data set and the new data set that meet the user defined search criteria.

16 Claims, 5 Drawing Sheets

SYSTEM AND METHOD FOR RECEIVING AND LOADING FARE AND SCHEDULE DATA

CROSS-REFERENCE TO RELATED APPLICATIONS

This application is a continuation of prior application Ser. No. 09/872,948, filed Jun. 1, 2001 now U.S. Pat. No. 7,231,382.

BACKGROUND OF THE INVENTION

The present invention relates to an improved system and method for receiving and loading updated data sets to a system configured to search such data sets with the purpose of identifying data elements within the data set that meet certain user defined search criteria. The invention has particular relevance for on-line search systems geared toward providing airline flight schedule and fare data to users. The system and method of the present invention may also be readily adapted to provide an improved system and method for receiving and loading updated data sets for searchable systems geared toward other products, services or any other searchable data.

In the commercial airline industry tickets are often distributed through Global Distribution Systems (GDS), sometimes also referred to as Computer Reservations Systems (CRS). These are large computerized reservation booking and ticketing systems such as Worldspan, Sabre, Galileo, and others. Until recently airline tickets could be only be booked either with the air carrier directly, or through an independent travel or ticketing agent. The most common method being through an agent.

In the typical travel agency office arrangement one or more computer terminals are installed in the agency offices. These dedicated terminals are connected directly with one of the major GDS systems. A customer of the travel agency generally visits or calls a travel agent associated with the firm and tells the agent his or her travel requirements. The specific details provided by the customer may include the destination, the travel dates, the desired departure times, and so forth. The agent then enters the customers request into one of the computer terminals connected to the GDS. The customer's request parameters are entered via a number of complex codes which require a great deal of training for the agent to learn. Once the customer's request is submitted to the GDS, the GDS processes the request and returns a list of flights that meet the customer's requirements including the fares associated with each flight. However, due to the large amount of computer overhead required to process each customer request, the GDS does not return every possible flight that might meet the customer's requirements. Rather, the GDS provides a limited list with the flights ranked in a specific order based on various rules established by the GDS. Due to the limited scope of the data returned for each request, travel agents often are able to quote the best possible fares that might be available.

Commerce over the Internet has the potential to greatly affect the way in which airline reservations, booking and ticketing take place. Already there are many online travel agencies through which individuals can search for fares, book flights and purchase tickets from their own personal computer (PC), without ever speaking to or visiting a travel agent. However, while these "online travel agents" provide reservations booking and ticketing services in a somewhat more convenient manner, they also suffer many of the same drawbacks as the traditional travel agent/GDS arrangement. For example, with most on-line travel agencies available flights and fares are still searched by the GDS. The on-line agent merely receives the user's request in a new manner, namely, over the Internet, but the back end processing remains the same. The on-line agent processes the request, generates the appropriate codes, and submits the request to the GDS. The GDS in turn supplies a limited list of flights and fares that meet the customer's requirements. The on-line merchant receives the results from the GDS and packages the results for display by the customer's web browser. The raw data itself, the list of available flights generated by the GDS suffers from the same limitations and is subject to the same display rules governing the display list provided to the travel agent's hard wired terminal in the traditional travel agent/GDS arrangement.

Recently an improved mechanism for searching for flight schedules and fares has been developed. This improved mechanism involves removing the flight schedule and fare searching functions from the GDS and performing them separately from the actual reservation booking and ticketing process. In this system the flight schedule and fare data which the airlines provide to the GDS are also sent to an offline cache memory from which the data may be transferred to various search engines for processing customer travel requests. This system may be distributed over numerous dedicated processors such that processing individual customer requests does not tie up large amounts of expensive computing resources at the expense of other functions that must be carried out simultaneously. Thus, comprehensive searches may be performed that identify every available flight that meets the criteria established in a customer travel request. Furthermore, the results can be ranked in any order independent of the ranking rules of the GDS, and improved display interfaces may also be devised.

However, while the improved remote caching and searching of flight schedule and fare data is an improvement over a purely GDS based system, there have been problems in implementing such a system on a large scale. One of the significant problems in implementing an off-line caching system is that it must be able to receive new data sets containing revised flight schedules and fare data, and seamlessly transition from searching an old data set to searching a new data set. Furthermore, the transition from searching the old data set to searching the new data set must be synchronized with the GDS. Synchronization with the GDS is necessary so that search results from searching the remote cached data will match the flights and fares that can actually be booked through the GDS. Thus, it is critical that the remote cache process transitions from the old data set to the new data set at the same time the GDS begins accepting bookings with the new data set. New data sets are made available by the airlines on a regular basis, typically three times per day. Thus, a remote cache based searching system must be capable of receiving new data several times a day with no apparent impact on the fare searching and ticketing process. Until now an efficient system and method for implementing such data set updates have not been available.

SUMMARY OF THE INVENTION

A system for searching a data set to identify data elements with the data set that meet user defined criteria is provided. The system comprises a network file system server, a data search engine server communicating with the network file system server, and a query distributor configured to send search queries to the data search engine server. An old data set and a new data set are stored on the network file system server in a manner such that said data search engine server may selectively access and transfer portions of the old data set and the new data set to a data storage memory of the data search engine server, where the data search engine server identifies data elements within the accessed portions of the old data set and the new data set that meet the user defined search criteria.

DETAILED DESCRIPTION

The present invention relates to a system and method for receiving and loading a new data set into a system for searching through such data sets in order to identify elements of a data set that correspond to user defined search criteria. In one embodiment of the invention, the system for searching the data sets is configured to search airline flight schedule and fare data in order to determine the lowest fares available for commercial flights meeting various search criteria established by a potential passenger using the system. In the low fare search embodiment of the invention the data sets searched by the low fare search system include schedule and fare data for a multiplicity of flights between various locations. The user defined criteria for searching the data may include a flight origination location, a destination, a date of travel, and a time of day. For example, a user may submit a request for flights between Chicago and San Francisco on May 25, departing before 8:00 a.m. After searching the available data set, the search system will return a list of flights for the morning of May 25 between Chicago and San Francisco leaving before 8:00 a.m. The list will include the fare associated with each flight.

Prior to describing the system and method of the present invention as applied to a search system configured to search for airline flight schedule and fare data, it should be noted that the present invention may be applied to search systems configured to search other data sets, such as car rental fares and availability, hotel rates, train schedules and fares and the like.

Figure 1:
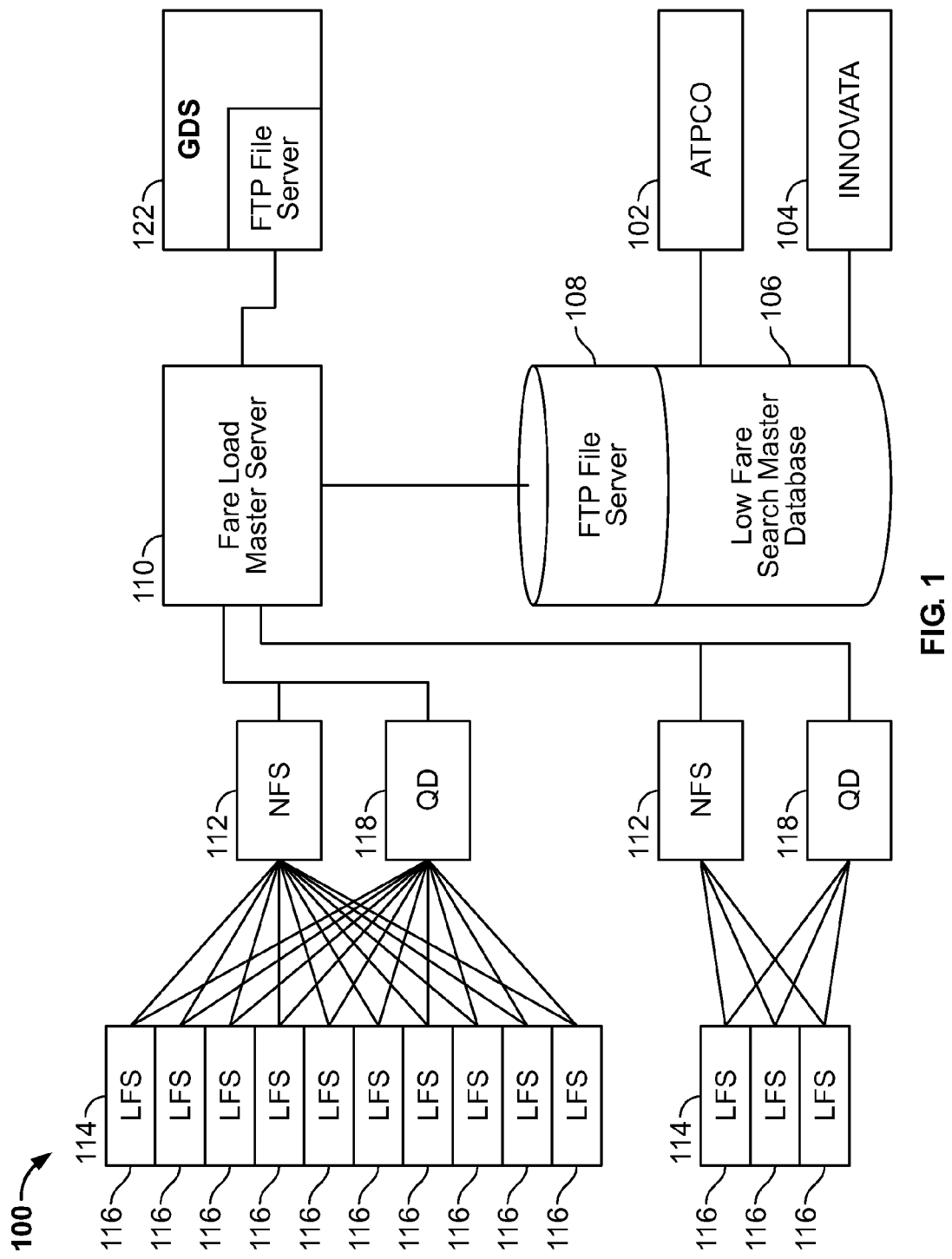
FIG. 1 is a block diagram of a system for searching a data set to identify data elements within the data set that meet certain user defined search criteria and for loading new data sets into the system for searching.
Figure 2A:
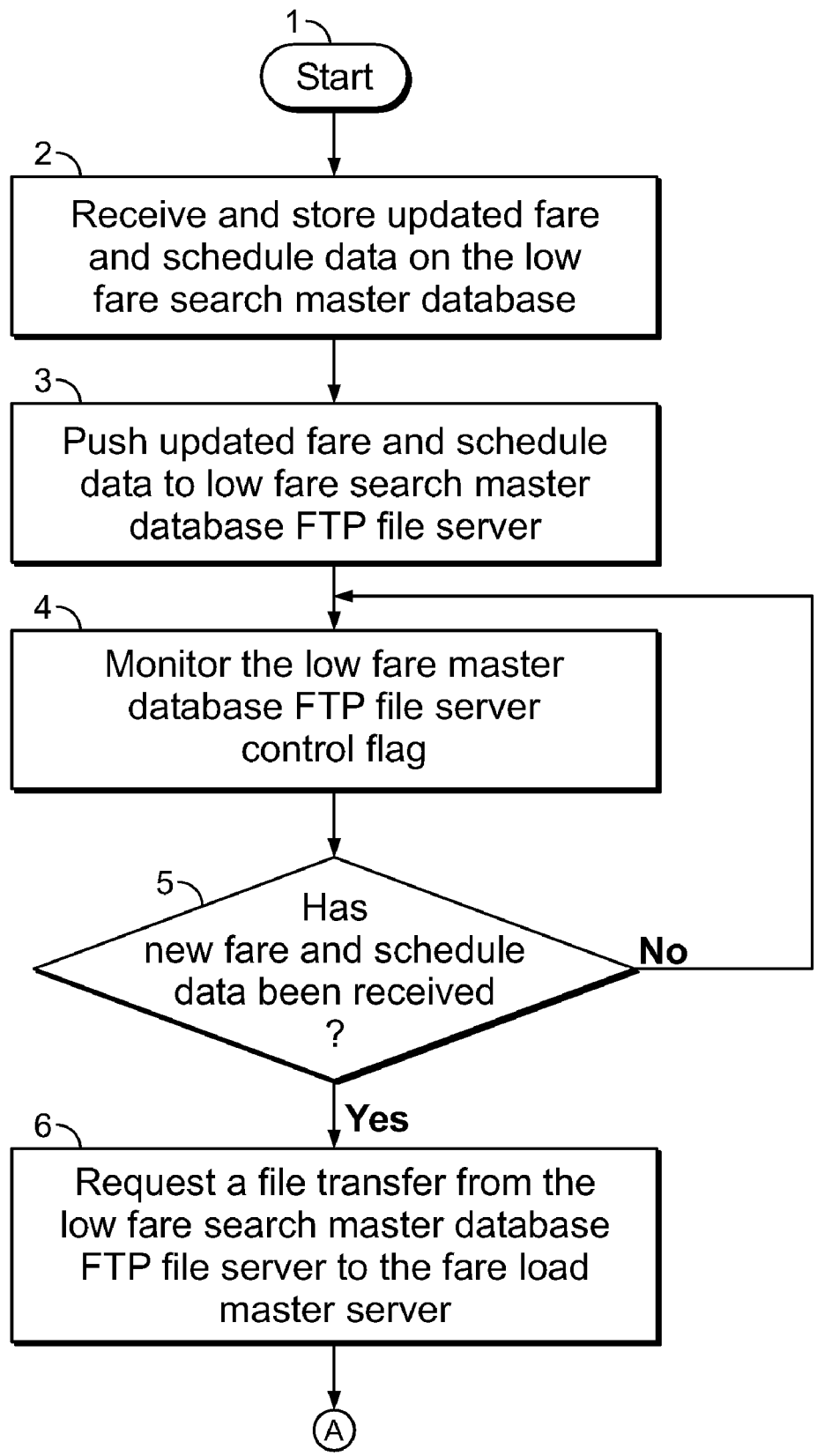
FIGS. 2a-2d are a flowchart showing a method of loading a new data set on a system configured to search a data set for data that meet user defined search criteria.
Figure 2B:
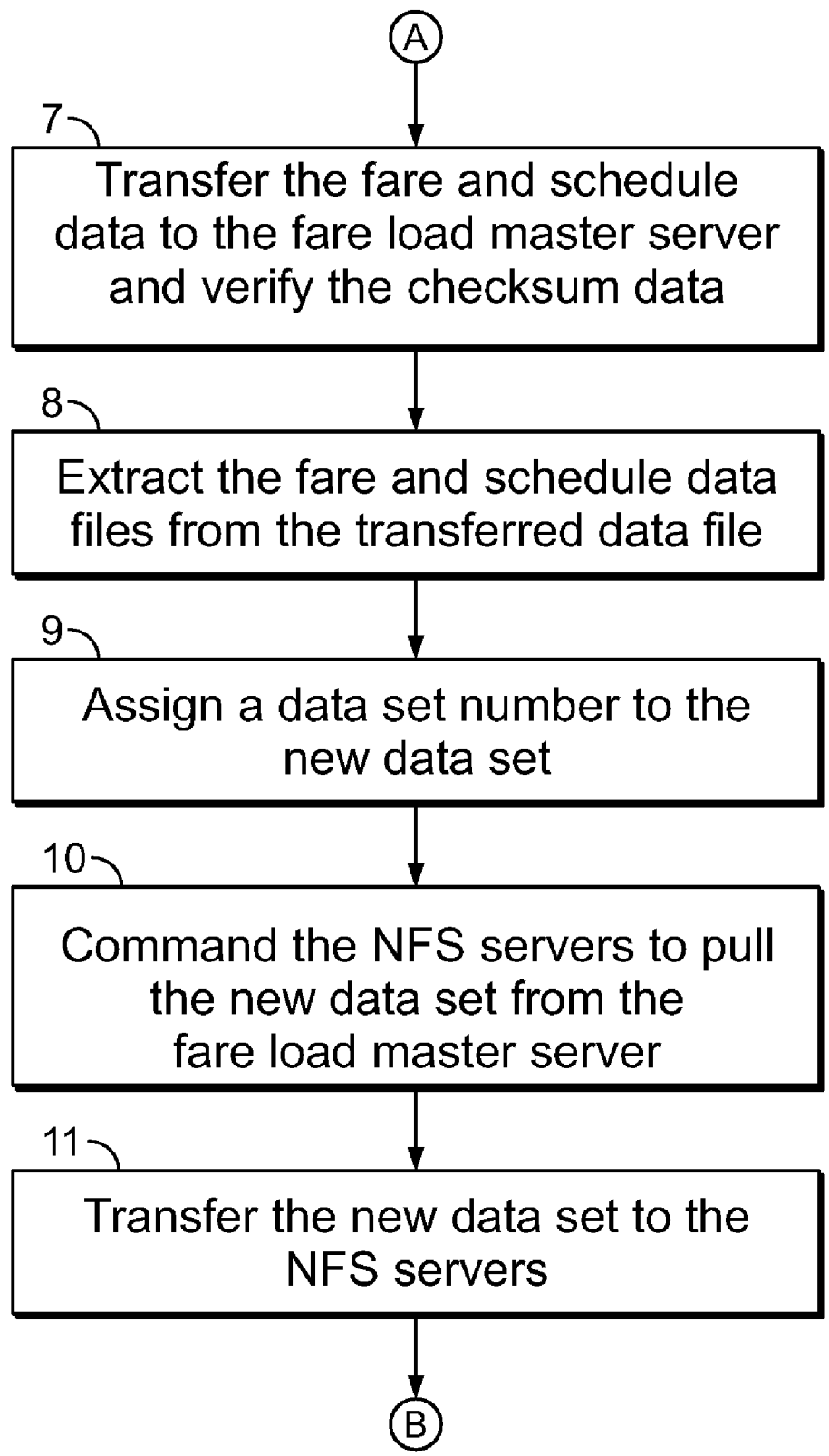
Figure 2C:
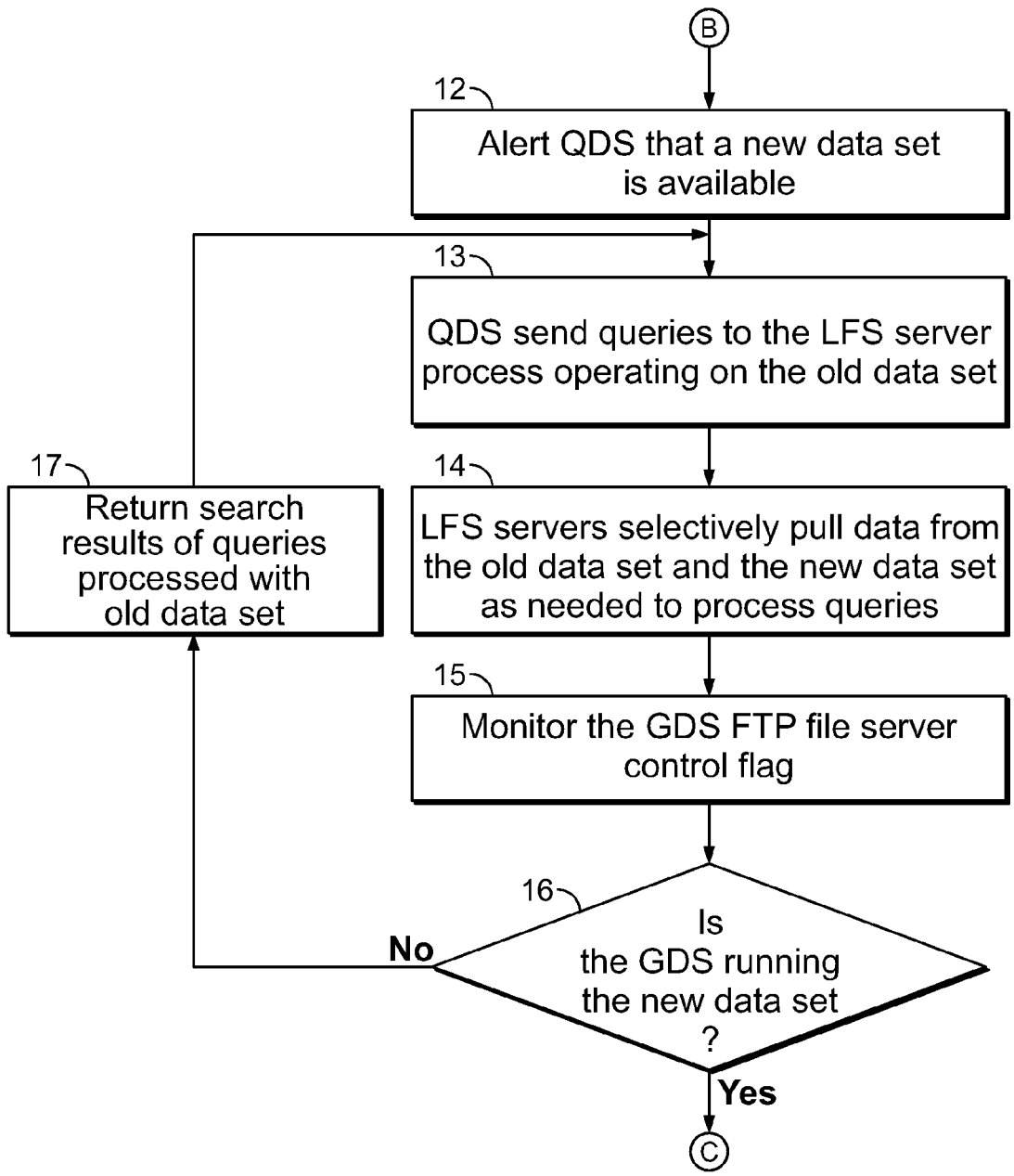
Figure 2D:
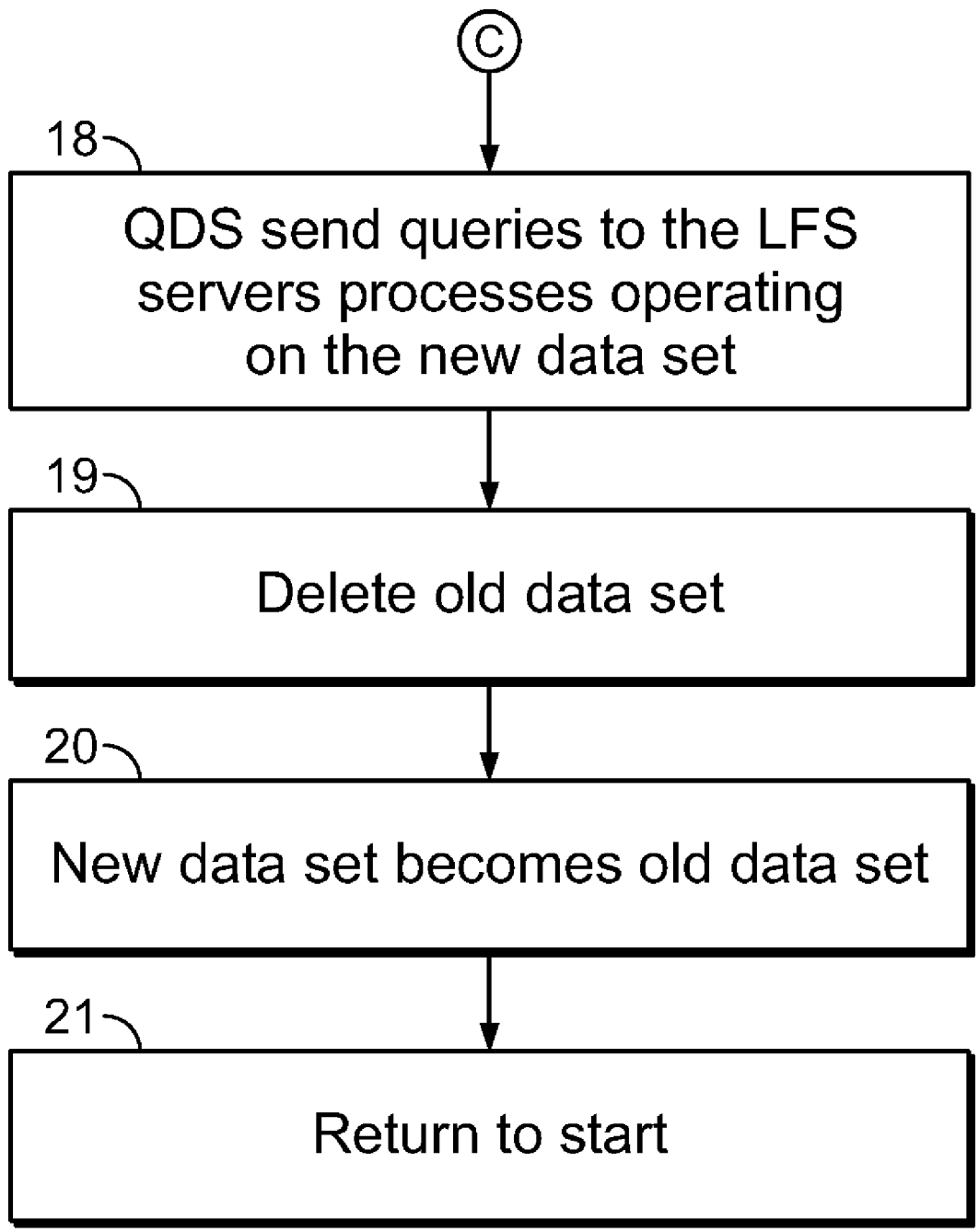

A block diagram of a system 100 for searching a data set, including a system for loading new data sets into the search system, is shown in FIG. 1. The system 100 includes a low fare search master database 106; a fareload master server 110; a number of network files system servers 112; a number of low fare search engine servers (LFS servers) 116; and a number of query distributors (QD) 118. The fareload master server 110 communicates with a global distribution system (GDS) 122 and the low fare search master database 106 receives data from outside sources such as ATPCO 102 and Innovata 104. The GDS 122, ATPCO 102 and Innovata are operated by third parties, and are not, strictly speaking, part of the system 100. However, the interaction between the fareload master server 110 and the GDS 122, and ATPCO 102 and Innovata 104 are integral to the method of receiving and loading new data sets when the present invention is practiced on a system for searching airline flight schedules and fares.

The architecture of the low fare searching system is as follows. A large number of LFS servers 116 are provided. The LFS servers are organized in racks, each rack containing up to ten LFS servers 116. Preferably, each LFS server is a Super Micro 6010H 1U Dual CPU stand alone computer operating with 1 GHZ Pentium 3 processors. Each LFS server 116 includes 2 Gbytes of on board random access memory (RAM). A network file system (NFS) server 112 and a query distributor (QD) 118 are provided for each rack of ten LFS servers 116. Conceptually, an NFS server 112 servicing a rack of ten LFS servers 116 interfaces directly with each LFS server in the rack, as indicated by the connections between the NFS servers 112 and the LFS servers 116 shown in FIG. 1. Physically, however, only a single connection need be provided between an NFS server 112 and its associated rack 114. A switch mounted in the LFS rack 114 distributes the signals between the NFS server 112 and the various LFS servers 116 in the rack 114. Similarly, the QD 118 servicing a rack of ten LFS servers 114 is conceptually connected to each LFS server 116 in a rack 114, but physically only a single signal connection is provided between the QD and the LFS rack 114. A switch distributes the signals passing between the QD 118 and the LFS servers 116.

Each LFS rack 114 along with the NFS server 112 and QD 118 associated therewith operates independently of every other LFS rack 114, NFS server 112 and QD 118. Therefore, the operation of but a single LFS rack 114 and its associated NFS server 112 and QD 118 will be described. The system 100 may be expanded as necessary to include any number of LFS racks 114, LFS servers, NFS servers and QD to meet the demands placed on the system. Each additional LFS rack, LFS server, NFS server and QD will operate in the same manner as the single LFS rack, NFS server and QD described below.

The QD 118 monitors the operation of the LFS servers 116 mounted in the LFS rack 114. The QD 118 manages the processing work load of each LFS server 116 by distributing search queries among the various LFS servers as they become available. Typically, the query distributor 118 will receive search requests from a user over a computer network. The network may be the Internet, the World Wide Web, or some other communications network. The search request will include user defined criteria, such as a city or location where a flight is to originate, a destination, and a desired date of travel. Other criteria, such as time of day, airline preference, seating preference and the like may also be included in the search request. The QD 118 monitors the status of each LFS server 116 in the LFS rack 114. Upon receiving a new search request, the QD formulates a search query based on the criteria defined in the search request, and forwards the query to an available LFS server 116 for processing.

After forwarding the query to a specific LFS server process, the QD 118 changes the monitored state of the LFS server process from available to unavailable. The LFS server process remains unavailable until it completes processing the query. Under normal operating conditions, i.e., when a new data set is not being loaded into the system 100, each LFS server 116 is configured to run two search processes at any given time. In other words, under normal operating conditions an LFS server 116 can process two queries simultaneously.

The entire data set through which the LFS servers search for data that meet the criteria established by the user request is stored on the NFS server 112. Preferably, the NFS server 112 is a Compaq DL360 dual processor computer. As an LFS server 116 processes a query, it accesses the data set stored on the NFS server 112 and searches those portions of the data set relevant to the search criteria set forth in the query. As the LFS server 116 searches the data set on the NFS server 112, it simultaneously copies the searched portions of the data set onto its own 2 Gbyte internal RAM. Thereafter, if another query requires a search of the same portions of the data set, the LFS server 116 can search the data from its own internal memory without recourse to the data set stored on the NFS server 112. This arrangement increases the speed with which user requests can be processed, and cuts the power requirements of the system 100 in that fewer LFS servers 116 are required to process a given number of user requests. The power requirements of the system are also significantly reduced due to the disc-less nature of the LFS servers 16. The 2 Gbyte RAM of each LFS server 116 require approximately half the amount of power consumed by a comparable disc storage system. The disc-less operation of the LFS servers 116 also improves the overall manageability of the system.

The system 100 is intended to operate on a continuous basis. Ideally there is to be no down time when users will not be able to access schedule and fare data. In addition to being reliable, the system 100 must be accurate. The data returned in response to user requests must accurately reflect the flight schedules and fares presently offered by the air carriers at the time the user request is filed, so that a user may actually book a flight at the fare provided in response to the user's request. In order for the system 100 to return accurate search results, the data set on which the searches are carried out must be updated from time to time to reflect changes in air carriers' flight schedules and pricing schemes. In light of the continuous operation requirement, updates to the data set must occur without interrupting the process by which user requests are processed. System 100 of the present invention provides a mechanism by which updates to the active data set are provided seamlessly with no noticeable impact on the operation of the system.

Typically, airlines update their fare and schedule data three times per day, although changes may be made more or less frequently as conditions require. Fare data for all commercial air carriers are published by an organization known as the Airline Tariff Publishing Company (ATPCO). Similarly, airline flight schedules are published by the Official Airline Guide (OAG), or an organization known as Innovata, another organization that publishes airline schedule data in addition to the OAG. Both ATPCO and Innovata provide data in electronic form. The low fare search master database 106, is configured to receive updated fare and schedule data sets from ATPCO and Innovata when the airlines revise their fare structures and schedules. ATPCO and Innovata transmit the updated data sets to the low fare search master database 106 via File Transfer Protocol (FTP) file transfer. The updated fare and schedule data sets are also sent to the GDS 122. Receipt of the updated fare and schedule data sets initiates the process for loading onto the system 100. In general, the fare and schedule data set loading process is coordinated by the fareload master server 110.

In addition to the system 100, the present invention also encompasses a method by which the seamless updates to new data sets take place. The process for loading a new data set into system 100 is best understood with reference to the flow chart shown in FIGS. 2a-2d in conjunction with the block diagram of FIG. 1.

The process begins at step 1. At step 2 the low fare search master database 106 receives and stores updated fare and schedule data set from ATPCO 102 and Innovata 104. Prior to storing the updated data set, the low fare search master database 106 processes the data to convert the raw data into a format compatible with the operating requirements of the system 100. A naming convention has been adopted in the airline ticket distribution industry whereby new data sets may be uniquely identified. According to this naming convention a new data set is given a time stamped file name YYYYMMDD.sub.13 (AM1 or PM1 or PM3) where YYYY is the year, mm is the month, and DD is the day that the data set is transferred into the system. The extension AM1, PM1, or PM3 corresponds to the first, second or third data transfer for the given day specified by the file name.

When the low fare search master database 106 has finished processing the received data set, the entire data set is "pushed" to an FTP file server 108 associated with the low fare search master database 106 at step 3. Two files are created in the FTP file server 108. The first is a large archive file that is made up of a large number of smaller files that make up the actual fare and schedule data. The archive data set file is identified by the time stamp naming convention described above with a .PGZ file extension appended thereto. The second file is an MD5 checksum file created from the data in the archive file. The data in the MD5 checksum file can be used to verify the integrity of the data in the archive file after the FTP file transfer. The creation of the MD5 checksum files also acts as a control flag indicating that a new data set is ready to be loaded into system 100. The MD5 Checksum file is identified according to the time stamp file naming convention described above, with a _READY_TO_GO.MD5 file extension appended thereto.

At step 4 the fareload master server 110 monitors a directory on the FTP file server 108, looking for the YYYYMMDD_(AM1 or PM1 or PM3)_READY_TO_GO.MD5 file. At step 5 the fareload master server 110 determines whether a new fare and schedule data set has been received and stored by the low fare search master database 106. If the fareload master server 110 does not locate the file YYY MDD_(AM1 or PM1 or PM3) READY TO_GO.MD5 file, it determines that new fare and schedule data have not been received and stored by the low fare search master database 106. In this case, process flow returns to step 4 where the fare load master server 110 continues to monitor the directory on FTP server 108. If, on the other hand, at step 5 the fareload master server 110 detects the YYYMMDD_(AM1 or PM1 or PM3)_READY_TO_GO.MD5 file, it determines that a new data set has been received and stored by the low fare search master database 106 and the process moves on to step 6.

At step 6 the fareload master server 110 requests an FTP file transfer from the FTP server 108. At step 7 the fare and schedule data is transferred to the fareload master server 110 and, when the FTP file transfer is complete, the fareload master serve 110 verifies the integrity of the transferred data by comparing the contents of the transferred YYYYMMDD_(AM1, or PM1 or PM2).PGZ file against the checksum data found in the YYYMMDD_(AM1 or PM1 or PM3)_READY_TO_GO.MD5 file. If an error is detected, the fareload master server may request a second file transfer. At step 8 the fareload master server extracts the individual files comprising the new data set, and stores the multiple files in a directory named according to the date/time stamp file naming convention. At step 9 the fareload master server 110 assigns a data set number to the data set according to a 1-6 rolling assignment procedure. A first received data set is assigned data set number 1, the second data set is assigned number 2, and so forth through the number six. The data set numbers are then recycled, with the next subsequent data set assigned number 1, and so forth.

At step 10 the fareload master server 110 sends a command to all of the NFS servers 112 in the system 100, commanding the NFS servers to pull the new data set from the fareload master server. The command sent to the NFS servers includes the name of the directory where the new data set files are stored, and the data set number (1-6) assigned to the new data set. At step 11 the NFS servers 112 pull the new data set from the fareload master server 110. It should be noted that the process of pulling the new data set from the fareload master server 110 to the NFS servers 112 could be reversed with no significant impact on the operation of the system 110. In other words, the new data set could just as easily be pushed from the fareload master server 110 to the NFS servers 112 as being pulled from by NFS servers. The NFS servers 112 in turn send messages to their associated LFS servers 116 telling them to begin running the two additional search processes on the new data set. The message from the NFS 112 servers includes the number of the new data set.

At this point in the process of uploading the new data set the fareload master server 110 enters a "sleep mode" for approximately 20 minutes while it waits for the GDS 122 to digest the new fair and schedule data. Prior to entering the "sleep mode," however, at step 12 the fareload master server 110 sends a message to the QDs 118 alerting the QDs that a new data set is available and identifying the new data set by the assigned data set number.

During this period both the old data set and the new data set are stored on the NFS servers 112, with each data set identified by its respective data set number (1-6). The QDs send search queries to the two search processes operating on the old data set at step 13. The LFS servers 116 process queries searching the old data set at step 14. The first pair of LFS search processes continue selectively pulling data from the old data set and searching data from the portions of the old data set previously copied from the NFS servers 112 to the LFS servers' 116 internal memory. Meanwhile, the second pair of LFS server search processes remain idle, selectively pulling only that data from the new data set necessary to initiate the processes and maintain the second processes in a state of readiness so that they will be immediately available when the QDs begin sending queries to the second set of search processes. QDs 118, which keep track of which search processes are handling which queries and which search processes are operating on which data set, continue to accept the search results from the first pair of search processes being performed by the LFS servers 116 on the old data set until they receive an instruction from the fareload master server 110 commanding them to switch over to the processes searching the new data set.

After its 20 minute "sleep mode," the fareload master server 110 "wakes up," and at step 15 begins monitoring an FTP file server associated with a Global Distribution System (GDS) 102, preferably the Worldspan GDS. When configured to monitor the FTP server of the Worldspan GDS, the fareload master server 110 monitors a file directory established by the GDS FTP file server. The GDS receives the updated fare and schedule data set at approximately the same time as the low fare search master database 106. The GDS must go through its own internal process of promoting the new data set and demoting the old. The 20 minute delay associated with the fareload master server 110 "sleep mode" allows the GDS 102 to process the new information. It is important that the LFS servers 116 are searching the same data set that the GDS is operating on so that search results returned in response to user queries will match the fares and flight schedules that may be actually booked through the GDS. Thus, the query distributors continue accepting the search results from LFS server search processes operating on the old data set until they receive the signal from the fareload master server 110 indicating that the GDS 102 is up and running with the new data set. The Worldspan GDS provides a signal indicating that its operations have switched over to the new data in the form of a file created in a designated directory of the Worldspan FTP file server. When the Worldspan GDS has completed its promotion of the new data set, it creates a file called SWAP.NOW in the designated directory of the FTP server. The fareload master server 110 monitors the directory looking for the existence of the SWAP.NOW file. If the file exists, the fareload master server 110 knows that the GDS is up and running with the new data set.

At step 16, the fareload master server determines whether the GDS is operating on the new data set by determining whether the SWAP.NOW file exists. If the fareload master server determines that the GDS is still running run the old data set, process flow branches off to step 17 where the QDs 118 continue to accept the search results of the LFS server processes searching the old data set. Thereafter, the searching and monitoring process repeats, as indicated by the process flow returning to step 13 where the query distributors instruct the LFS servers to continue processing queries with the processes operating on the old data.

If, however, at step 16 the fareload master server 110 determines that the GDS is operating with the new data set, the fareload master server sends a signal to the query distributors at step 18 telling the QDs 118 to begin sending queries to the LFS server processes searching the new data set. After a short delay in which searches initiated before the switch command was issued are allowed to complete, a signal is sent from the QDs to "demote" the old data set as shown in step 19. The step of demoting the old data set involves deleting the old data set from the LFS servers' RAM memory and deleting the old data set from the NFS servers. Upon demoting the old data set, the new data set becomes the de facto old data set as indicated at step 20. The process returns to the beginning at step 21 where it begins again with the next data set update.

Although the present invention has been shown and described with respect to a preferred embodiment thereof, it should be understood by those skilled in the art that the foregoing and various other changes, omissions, and additions in the form and detail thereof may be made therein without departing from the spirit and scope of the present invention.

What is claimed is:

1. A system for searching a data set to identify data elements within said data set that meet user defined search criteria, the user defined search criteria including an origination location, a destination location, and a date of travel, the system comprising:

a network file system server;

a data search engine server communicating with the network file system server, said data search engine server including a data storage memory;

a query distributor configured to send search queries to the data search engine server; and an old data set comprising status information and a new data set, comprising updated status information which reflects a change to the status information, stored on the network file system server in a manner such that said data search engine server may selectively access and transfer portions of the old data set and the new data set to the data storage memory of the data search engine server, where the data search engine server identifies data elements within the accessed portions of the old data set and the new data set that meet the user defined search criteria, wherein the status information includes air carrier fare and schedule data for flights between a plurality of origination and destination locations, and the portions of the old data set and the new data set accessed by the data search engine server comprise flight schedule and fare data for airline flights between the origination location and destination location on the date of travel specified in the user defined search criteria.

2. The system for searching data of claim 1, wherein the data storage memory of the data search engine comprises a random access memory.

3. The system for searching data of claim 1, wherein the data storage memory comprises disc-less storage device.

4. The system for searching data of clam 1, further comprising a plurality of data search engine servers communicating with the network file system server.

5. The system for searching data of claim 1, further comprising a plurality of network file system servers and a plurality of data search engine servers communicating with the network file system server.

6. A computer-implemented method for searching a data set to identify data elements within said data set that meet user defined search criteria, the user defined search criteria including an origination location, a destination location, and a date of travel, the method comprising:
  receiving a first data set, including status information comprising air carrier fare and schedule data for flights between a plurality of origination and destination locations, at a network file system server;
  receiving a user search query comprising user defined search criteria; and
  searching the first data to identify data elements within the first data set that meet the user defined search criteria;
  receiving a second data, including undated status information comprising air carrier fare and schedule data for flights between a plurality of origination and destination locations, after the first data set, at the network file system server;
  selectively accessing portions of the first data set and the second data set, and
  searching accessed portions of the first data set and the second data set to identify data elements within each data set that meet the user defined search criteria, wherein the accessed portions comprise flight schedule and fare data for airline flights between the origination location and destination location on the date of travel specified in the user defined search criteria.

7. A system for searching a data set to identify data elements within said data set that meet user defined search criteria, the user defined search criteria including an origination location, a destination location, and a date of travel, the system comprising:
  a network file system server;
  a data search engine server communicating with the network file system server, said data search engine server including a data storage memory;
  a query distributor configured to send search queries to the data search engine server; and
  a first data set comprising status information and a second data set, comprising updated status information, which reflects an update to the status information in the first data set, stored on the network file system server in a manner such that said data search engine server may selectively access and transfer portions of the first data set and the second data set to the data storage memory of the data search engine server, wherein the data search engine server identifies data elements within the accessed portions of the first data set and the second data set that meet the user defined search criteria, wherein the status information comprises air carrier fare and schedule data for flights between a plurality of origination and destination locations, and the portions of the first data set and the second data set accessed by the data search engine server comprise flight schedule and data for airline flights between the origination location and destination location on the date of travel specified in the user defined search criteria.

8. The system for searching data of claim 7, wherein the data storage memory of the data search engine comprises a random access memory.

9. The system for searching data of claim 7, wherein the data storage memory comprises a disc-less storage device.

10. The system for searching data of claim 7, further comprising a plurality of data search engine servers communicating with the network file system server.

11. The system for searching data of claim 7, further comprising a plurality of network file system servers and a plurality of data search engine servers communicating with each network file system server.

12. The system for searching data of claim 7, wherein the query distributor accepts identified data elements from the accessed portions of the first data set prior to receiving a command to switch to the second data set and the query distributor accepts identified data elements from the accessed portions of the second data set after receiving the command to switch to the second data set.

13. The system for searching data of claim 6, wherein the query distributor accepts identified data elements from the accessed portions of the old data set prior to receiving a command to switch to the new data set and the query distributor accepts identified data elements from the accessed portions of the new data set after receiving the command to the switch to the new data set.

14. The method of claim 6, wherein the step of selectively accessing comprises transferring the accessed portions to a random access memory.

15. The method of claim 6, wherein the step of selectively accessing comprises transferring the accessed portions to a disc-less storage device.

16. The system for searching data of claim 6, further comprising:
  receiving a command to switch to the second data set, and
  receiving only elements from the accessed portions of the second data set after receiving the command to the switch to the second data set.

* * * * *